June 18, 1935. C. TIETIG 2,005,249
EXHAUST GAS PURIFIER
Filed Feb. 4, 1930
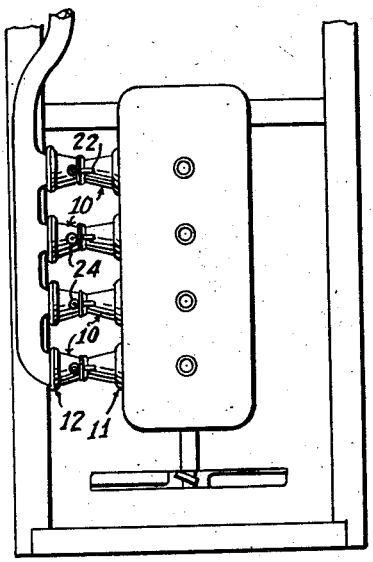
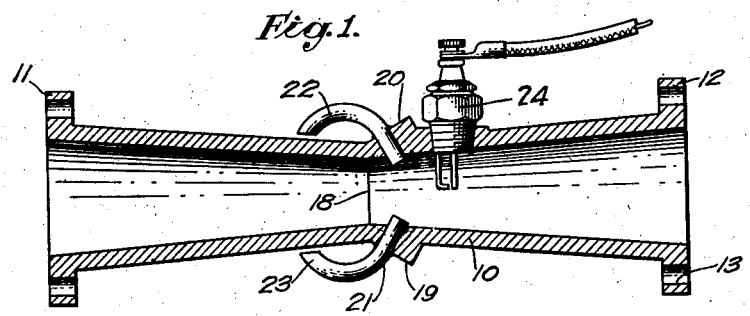
INVENTOR:
Chester Tietig Patented June 18, 1935

2,005,249

UNITED STATES PATENT OFFICE 2,005,249

EXHAUST GAS PURIFIER

Chester Tietig, Los Angeles, Calif.

Application February 4, 1930, Serial No. 425,911

4 Claims. (Cl. 60—30)

This invention relates to a device for purifying the exhaust gases of internal combustion engines, particularly of automobile engines, so that these gases may be respired after purification, without substantial injury to the human body.

Among the objects of this device are the conversion of the carbon monoxide in the exhaust gases to carbon dioxide and also the conversion of the unburned oil and gasoline vapors in such gases substantially to carbon dioxide and water. Such combustion results in the substantial elimination of not only the poisonous qualities of the exhaust gases, but also of their stench.

Briefly stated, the apparatus invention comprises a means of introducing into the stream of hot exhaust gases, a comparatively small stream of hot, pure air, said air being sucked into the stream of exhaust gases by the motive power of the exhaust gases themselves which thereby constitutes an automatic proportioning means.

Fig. 1 shows a longitudinal cross section of the device; and Fig. 2 illustrates one way in which the device may be applied to the exhaust-gas line of an automobile engine.

In Figure 1 of the drawing is shown one form of my exhaust gas purifier comprising a Venturi tube 10 made preferably of cast iron and provided with end flanges 11 and 12, the flanges being provided with bolt holes 13. The flange 11 may be, and preferably is, adapted to fit the exhaust port or cylinder of an internal combustion engine which is to be equipped with my device, such as an automobile engine as illustrated in Fig. 2. The other flange 12 may be and preferably is, adapted to fit the flange of the engine's exhaust manifold. Both flanges preferably are alike so that the device may be inserted into the exhaust-gas line as a section thereof preferably at a location as close to the exhaust manifold as possible, suitable gaskets being disposed between the joints in accordance with the best mechanical practice.

As illustrated in the cross-sectional view of Fig. 1, the Venturi tube 10 comprises two oppositely directed flared sections which are united to form a constricted neck 18. Upon the exterior of the venturi adjacent and to the rear of the neck 18 is a flared portion 19, the forward face 20 of which contains a plurality of perforations 21 arranged about its circumference. The purpose of the portion 19 is to provide a thick body of metal into which air tubes 22 may be fastened in a manner such that the position of the tubes entering the venturi are directed at a slight inclination toward the discharge end of the purifier. The air tubes are open at both ends and extend through and are rigidly fixed within the perforations 21. The portions of the air tubes disposed exteriorly of the Venturi tube 10 are arcuately bent toward the circumference of the venturi so that their ends 23 lie in proximity to but terminate a spaced distance from the venturi. By this construction the air entering the air tubes is taken from the zone surrounding the venturi and consequently will have been warmed by the heat lost by conduction through the wall of the venturi from the hot exhaust gases passing therethrough.

The ends of the air tubes communicating with the interior of the venturi may extend only a short distance beyond the inner circumference of the venturi so as not to unduly obstruct its passage. A spark plug 24 having especially long electrodes may be advantageously arranged to the rear of the neck toward the discharge end of the purifier, this spark plug being designed to spark practically continuously while the engine is running to ignite the gas and air mixture. The spark plug, however, under some conditions may be dispensed with.

In the operation of the purifier the exhaust gases from the engine flow through the Venturi tube creating a partial vacuum a short distance beyond the throat of the venturi, in the zone where the air tubes 22 communicate with the venturi, thus causing preheated fresh air to be sucked in through the air tubes and mingled with the hot exhaust gases. The exhaust gases heat the air during its passage through the Venturi tube whereby it is placed in excellent condition to ignite in the stream of hot combustible vapors which the exhaust gases comprise. Ignition follows and the CO, $H_2$ and atomized oil vapors are substantially, or entirely, burned to $CO_2$ and water.

As is shown in Fig. 2, preferably each cylinder of an automobile engine will be independently equipped with a purifier arranged intermediate the exhaust port of a cylinder and the exhaust manifold so that the exhaust gases will be at the highest possible temperature when mixed with the fresh tempered air drawn in through the air tubes whereby to insure combustion of the unburned exhaust gases without requiring the operation of the spark plug 24 to raise the mixture to combustion temperature.

An important feature of my invention, in addition to its relatively simple construction over devices of the prior art, resides in the arrangement of the air tubes 22 to aspirate the heated air surrounding the hot external portion of the Venturi tube, so that the fresh air entering the purifier does not unduly chill the exhaust gases below ignition temperature. This contributes to the efficiency of the device and also permits it to be located in the exhaust-gas line, if necessary or desirable, at a point farther removed from the exhaust port of the cylinder where the exhaust gases are not so highly heated.

I claim as my invention:

1. An exhaust gas purifier comprising a Venturi tube having an internal constricted throat, said Venturi tube being adapted to be interposed within and constitute a part of the exhaust-gas line of an internal combustion engine, and an open-ended air tube passing through the wall of the Venturi tube and having one of its ends disposed in proximity to the outer surface of the Venturi tube and its other end communicating with the Venturi tube rearwardly of its throat at the outlet side thereof.

2. An exhaust gas purifier comprising a Venturi tube having an internal constricted throat, said Venturi tube being adapted to be interposed within and constitute a part of the exhaust-gas line of an internal combustion engine, and an open-ended air tube passing through the wall of the Venturi tube and having one of its ends disposed in proximity to the outer surface of the Venturi tube and having its other end communicating with the Venturi tube rearwardly of its throat and at the outlet side thereof, said air tube having its end which communicates with the Venturi tube projecting into the passage of the Venturi tube and directed angularly toward the discharge end of the Venturi tube.

3. An exhaust gas purifier comprising a Venturi tube having an internal constricted throat, said Venturi tube being adapted to be interposed within and constitute a part of the exhaust-gas line of an internal combustion engine, an open-ended air tube passing through the wall of the Venturi tube and having one of its ends disposed in proximity to the outer surface of the Venturi tube and its other end communicating with the Venturi tube rearwardly of its throat at the outlet side thereof, said air tube having its end which communicates with the Venturi tube projecting into the passage of the Venturi tube and directed angularly toward the discharge end of the Venturi tube, and ignition means located within the Venturi tube a short distance rearwardly of the air tube.

4. An exhaust gas purifier comprising a Venturi tube having an internal constricted throat, said Venturi tube being adapted to be interposed within and constitute a part of the exhaust-gas line of an internal combustion engine, and a plurality of open-ended air tubes extending through the wall of the Venturi tube, the portions of said air tubes extending exteriorly of the Venturi tube being bent to dispose the ends of said air tubes in proximity to the outer surface of the Venturi tube, said air tubes having their opposite ends communicating with the Venutri tube at points located a relatively short distance beyond the outlet side of its throat.

CHESTER TIETIG.